United States Patent
Lurati et al.

(10) Patent No.: US 9,803,970 B2
(45) Date of Patent: Oct. 31, 2017

(54) DEVICE TO DETERMINE THE DIAMETER OF THE CONDUCTOR OF A WIRE

(75) Inventors: Stefan Lurati, Rickenbach (CH); Benno Häfliger, Luzern (CH)

(73) Assignee: KOMAX HOLDING AG, Dierikon (CH)

( * ) Notice: Subject to any disclaimer, the term of this patent is extended or adjusted under 35 U.S.C. 154(b) by 2298 days.

(21) Appl. No.: 11/538,093

(22) Filed: Oct. 3, 2006

(65) Prior Publication Data
US 2007/0121796 A1    May 31, 2007

(30) Foreign Application Priority Data
Oct. 5, 2005    (EP) .................................... 05109264

(51) Int. Cl.
| | | |
|---|---|---|
| *G01B 7/12* | (2006.01) | |
| *H02G 1/12* | (2006.01) | |
| *H02G 1/00* | (2006.01) | |

(52) U.S. Cl.
CPC ............... *G01B 7/12* (2013.01); *H02G 1/005* (2013.01); *H02G 1/1253* (2013.01); *H02G 1/1256* (2013.01); *Y10T 83/525* (2015.04); *Y10T 83/541* (2015.04)

(58) Field of Classification Search
CPC ... G01B 7/02; G01B 7/06; G01B 7/12; G01N 27/023; G01R 27/00; H02G 1/1253; H02G 1/1256; H02G 1/1258; H02G 1/005; H02G 1/1248; Y10T 83/081; Y10T 83/091; Y10T 83/505; Y10T 83/515; Y10T 83/525; Y10T 83/541

USPC ......... 83/58, 63, 358–360, 370; 33/783–786, 33/792, 806; 30/90.1; 324/699, 700
See application file for complete search history.

(56) References Cited

U.S. PATENT DOCUMENTS

| | | | | |
|---|---|---|---|---|
| 4,999,910 A | * | 3/1991 | Cross ................... | H02G 1/1265 29/426.5 |
| 5,348,208 A | * | 9/1994 | Tamura ................. | B65H 61/00 226/24 |
| 5,886,521 A | * | 3/1999 | Hassan ................. | G01B 7/023 324/227 |
| 2002/0166236 A1 | * | 11/2002 | Bernardelle et al. ...... | H02G 1/1256 30/91.2 |

(Continued)

FOREIGN PATENT DOCUMENTS

| | | |
|---|---|---|
| JP | 58194275 A | 11/1983 |
| JP | 02133016 A | 5/1990 |

(Continued)

*Primary Examiner* — Clark F Dexter
(74) *Attorney, Agent, or Firm* — William J. Clemens; Shumaker, Loop & Kendrick, LLC

(57) ABSTRACT

A wire-processing device includes a first advancing device, a cutter head, and a second advancing device. The first advancing device pulls the wire out of a wire store and advances according to the desired length of wire to be cut. After the wire is cut through by the cutter head, the wire-ends of the wire-length are processed. The wire-processing device is provided with a device to determine the diameter of the conductor of the wire including an input coupler that generates in the wire a wire signal, and wherein the wire signal can be sensed by an output coupler which generates an input signal which is interpreted by a signal processor, wherein the cutters of the cutter head touch the conductor and change the input signal when cutting into the wire.

12 Claims, 4 Drawing Sheets

(56) References Cited

U.S. PATENT DOCUMENTS

2003/0128037 A1* 7/2003 Christopherson et al. ................
G01R 31/2839
324/543

FOREIGN PATENT DOCUMENTS

| JP | 5068311 A | 3/1993 |
|----|-----------|--------|
| JP | 06 253430 A | 9/1994 |
| JP | 07 227022 A | 8/1995 |
| JP | 07 236214 A | 9/1995 |
| JP | 11 299036 A | 10/1999 |
| JP | 2000 354315 A | 12/2000 |

* cited by examiner

DEVICE TO DETERMINE THE DIAMETER OF THE CONDUCTOR OF A WIRE

BACKGROUND OF THE INVENTION

The present invention relates to a device to determine the diameter of the conductor of a wire by means of an input coupler to apply a signal to the wire and an output coupler to sense the signal on the wire and a signal processor to generate the signal to be applied to the wire and to measure the signal on the wire.

In the patent application JP 11299036 there is shown a device for determining the diameter of the conductor of a wire. An electric coil couples a signal onto the wire whose diameter is to be determined. During the process of stripping the insulation from the end of the wire, stripping cutters cut into the sheath of the wire as far as the conductor and create an electrical contact with the conductor whereby the signal coupled onto the wire is transferred to the cutters. The cutters are connected to a measuring device that senses the contact of the cutters with the conductor as a voltage drop across a resistance.

A disadvantage of this known device is that the cutter head with the stripping cutters must be insulated against a fixed potential or ground, so that the signal that is coupled onto the wire can be sensed on the cutter head or on the cutters.

SUMMARY OF THE INVENTION

The present invention provides a solution for avoiding the disadvantages of the known device, and creating a device by means of which the diameter of the conductor of a wire can be easily determined.

The advantages achieved by means of the present invention are mainly to be seen in that a conventional cutter head or a cutter head that is electrically grounded can be used. It is also not necessary for the end of the wire to be connected to ground or a fixed potential. Finding the end of the wire in a wire drum would anyway be tedious and time-consuming. To measure the diameter of the conductor, the cutter head need not be changed. The sensor required to output-couple the input-coupled signal is an electrically insulated wire guide. Insulating the wire guide is substantially easier and cheaper than insulating the cutter head. Furthermore, the sensor can be used on different wire-processing devices. With the device according to the present invention, determination of the diameter of the conductor can be automated, which in turn substantially shortens the time for setting up the wire-processing device.

In the device according to the present invention, for the purpose of sensing a signal on the wire, a contactlessly functioning output coupler is provided, the signal being capable of being changed by means of at least one contact element that contacts the wire conductor.

DESCRIPTION OF THE DRAWINGS

The above, as well as other, advantages of the present invention will become readily apparent to those skilled in the art from the following detailed description of a preferred embodiment when considered in the light of the accompanying drawings in which.

DESCRIPTION OF THE PREFERRED EMBODIMENT

Figure 1:
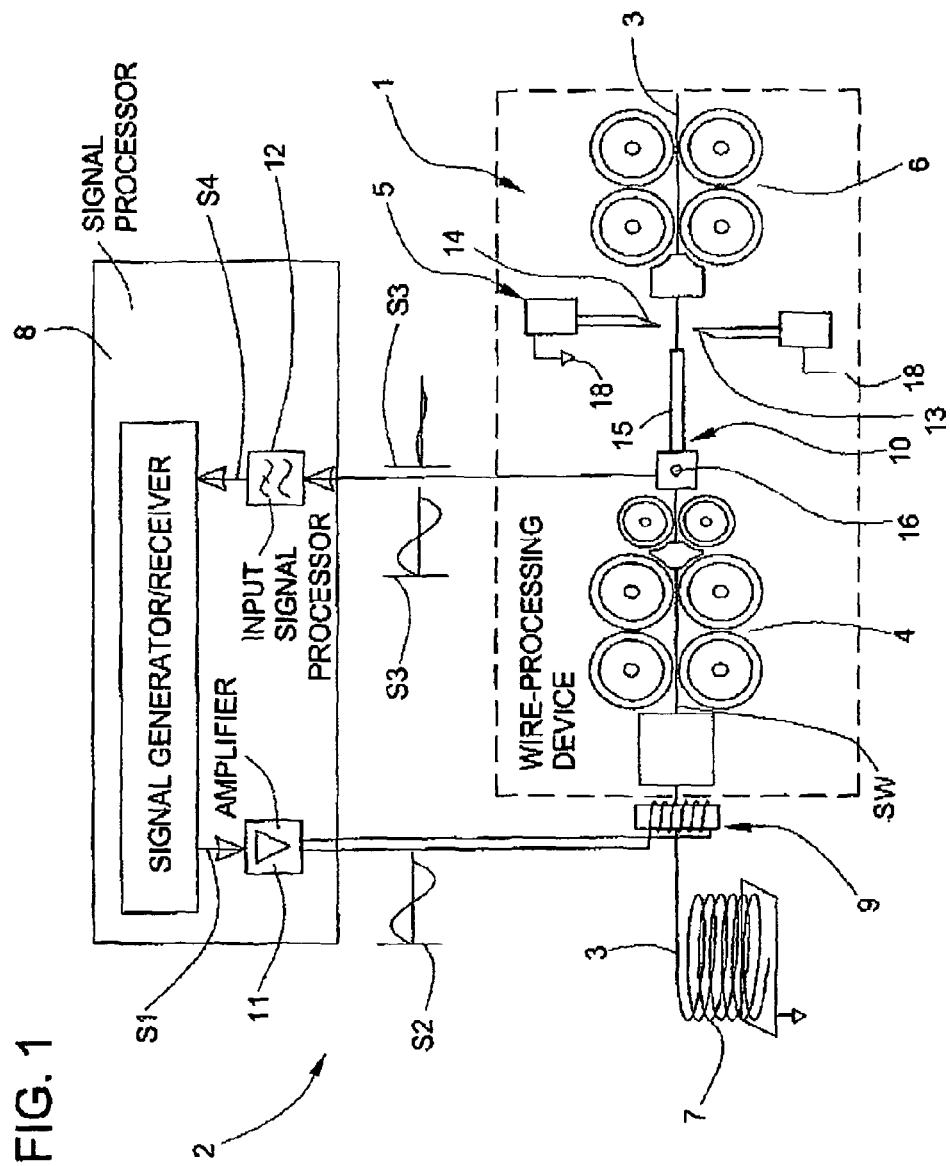
FIG. 1 is a schematic diagram of a wire-processing device with a device to determine the diameter of the conductor of a wire according to the present invention.

FIG. 1 shows a wire-processing device 1 with a device 2 to determine the diameter of the conductor of a wire 3. The wire-processing device 1 shown in FIG. 1 consists, for example, of a first advancing device 4, a cutter head 5, and a second advancing device 6. By means of the first advancing device 4, the wire 3 is pulled out of a wire store 7, for example wire stored in a drum, and advanced according to the desired length of wire to be cut off. After the wire 3 has been cut through by means of the cutter head 5, the wire-ends of the wire-length are processed (for example, stripped of insulation, fitted with sleeves, crimp-contacts pressed on). The leading wire-end of the wire 3 can also be processed before the wire-section is cut off. The processing stations and grippers that are needed to present the wire-ends for processing the wire-ends are not shown.

The wire 3 normally consists of a conductor that is surrounded by an electrically insulating sheath. To process the wire-ends it is essential to know or determine the diameter of the conductor. Dependent on the diameter of the conductor are, for example, the depth of penetration of the insulation-stripping cutter, the choice of crimp-contact, the choice of sleeve, the presentation of the crimp press, etc.

The device 2 shown in FIG. 1 for determining the diameter of the conductor of the wire 3, hereafter referred to as the measuring device 2, consists essentially of a signal processor 8, an input coupler 9, and an output coupler 10. The signal processor 8 generates a first output signal Si, for example a sine signal of 40 kHz with variable amplitude (other signal forms are also possible), that is fed to an amplifier 11 that amplifies the signal S and feeds it as a second output signal 82 to the input coupler 9, By regulation of the signal amplitude on the input coupler 9, the measuring device 2 can be automatically adapted to the respective situation (wire type, guide type of the wire, arrangement of the input coupler and output coupler on the wire-processing device). The input coupler 9 transfers the second output signal S2 to the conductor by means of inductance. At one end, the wire store 7 is capacitively connected to a fixed potential or ground, hereafter referred to as ground 18. At the other wire-end a signal SW on the wire 3 can be sensed contactlessly, for example capacitively, by means of the electrically insulated output coupler 10, and a first input signal S3 can be fed to a signal processor 12. The signal S3 is rectified, filtered, amplified, and fed to the signal processor 8 as a second input signal 84. If the input signal 83 does not attain the necessary amplitude, the signal processor 8 generates an error message. As soon as cutters 13, 14, of the cutter head 5 that are connected to the ground 18 touch the conductor, the amplitude of the wire signal SW and thus the first input signal S3 decreases. From the change in the signal (change in amplitude independent of the phase displacement of the signal), the signal processor 8 recognizes that the cutters 13, 14 are touching the conductor. Simultaneously, the feed (depth of penetration) or position of the cutters 13, 14 that are, for example, flat or V-shaped, is sensed and the diameter of the conductor thereby determined.

Instead of the cutters that penetrate into the wire 3 and make contact with the conductor, contact elements in the form of, for example, motorized needles can be provided whose depth of penetration can be measured and that extend as far as the conductor.

Figure 2:
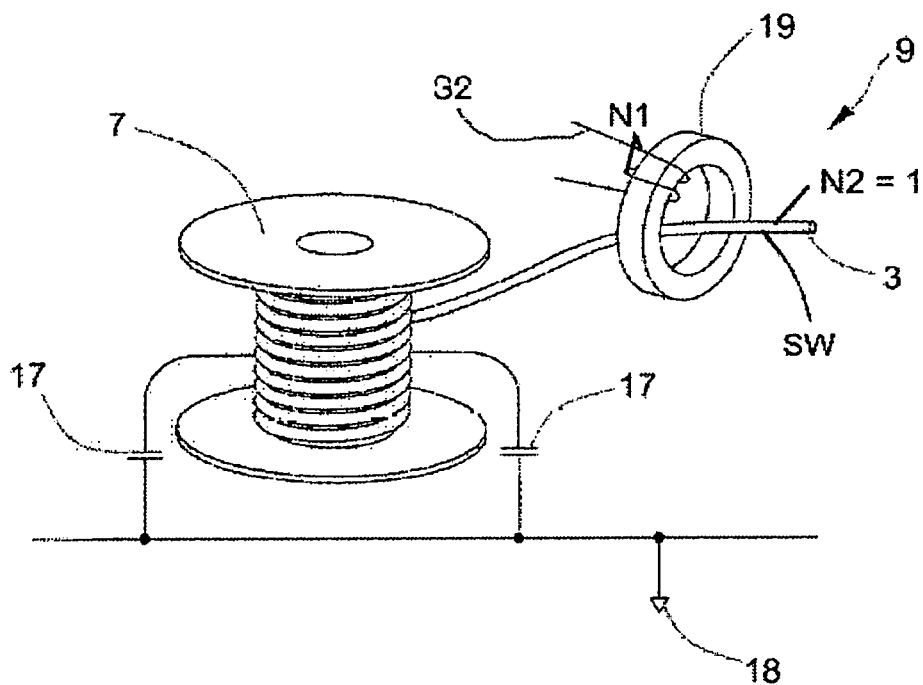
FIG. 2 is a perspective view of the input coupler to apply a signal to the wire as shown in FIG. 1.

FIG. 2 shows the input coupler 9 for applying the signal S2 to the wire 3 to generate the wire signal SW. The wire store 7 is connected to ground 18 by means of capacitive coupling 17. The wire 3 is passed through a coil or ring core 19 and thereby forms a single secondary winding N2 of the coil 19 that interacts on the principle of the transformer with a primary winding N1. For the signal SW on the secondary side to be as large as possible, the signal S2 on the primary side must be as large as possible, and the winding ratio N1/N2 as small as possible.

For special wires such as, for example, flat cables, instead of the ring core 19, the coil 19 can have a U-shaped core.

The output coupler 10 consists essentially of a wire guide 15, for example a tube, that is electrically insulated against ground 18 and that acts as a capacitive sensor or has a capacitive sensor arranged on it. The wire signal SW can be sensed by means of such a capacitive sensor in the disclosed embodiment, the wire guide 15. The wire guide 15 can be arranged movably around a rotating axle 16.

Figure 3:
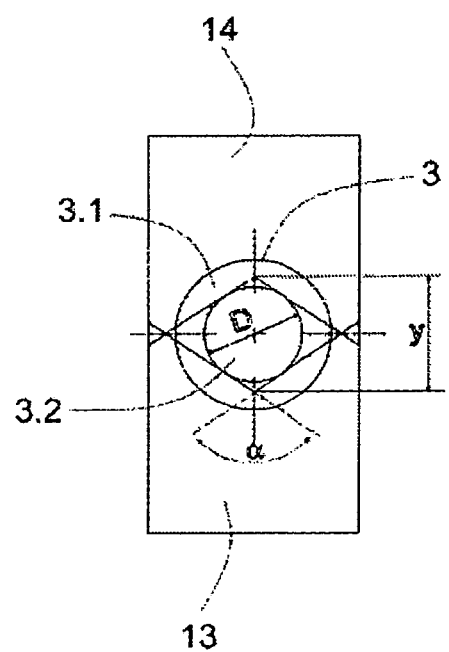
FIG. 3 is a schematic view of the V-shaped cutters to cut into the sheath of the wire and to determine the diameter of the conductor as shown in FIG. 1.

FIG. 3 shows the V-shaped cutters 13, 14 for cutting into a sheath 3.1 and for determining a conductor diameter D of a conductor 3.2. The diameter D of the conductor 3.2 is calculated according to the formula $$D = y \cdot \sin(\alpha/2)$$

where "y" is derived from a position of the cutter at contact (that can be determined by means of a shaft encoder of the cutter drive or by means of a linear scale) and "α" is the angle of opening of the cutter.

As soon as the cutters 13, 14, while cutting, touch the conductor 3.2, the signal SW and thus the signal S3 are changed, which in turn triggers sensing of the momentary position "y" of the cutters.

Figure 4:
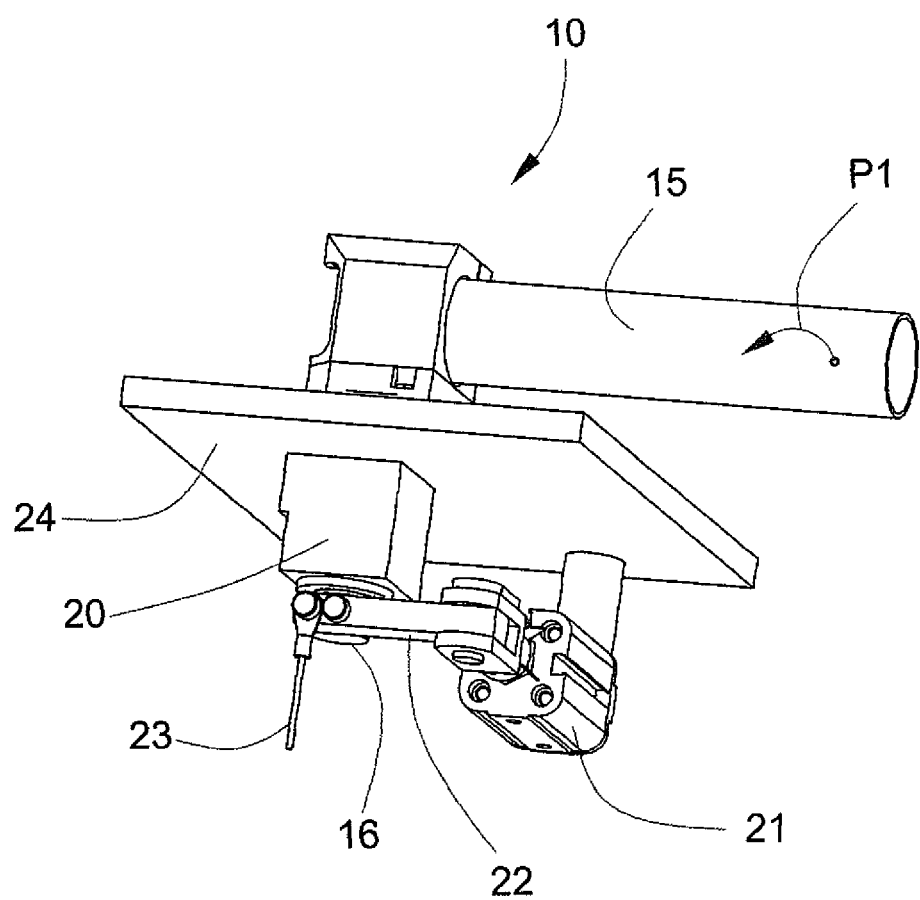
FIG. 4 is a perspective view of the output coupler to sense the signal on the wire as shown in FIG. 1.

FIG. 4 shows the output coupler 10 for sensing the signal SW on the wire 3. The wire guide 15 is arranged on the rotating axle 16 that is mounted rotatably and electrically insulated on a bearing block 20. The bearing block 20 is borne by a housing part 24. A lever drive 21 that is arranged on the housing part 24 actuates a lever 22 that turns the rotating axle 16. The turning of the rotating axle 16 causes the wire guide 15 to be swiveled out of the lengthwise axis of the wire as symbolized by an arrow P1. A signal wire 23 that carries the signal S3 is in electrical contact with the wire guide 15.

Figure 5:
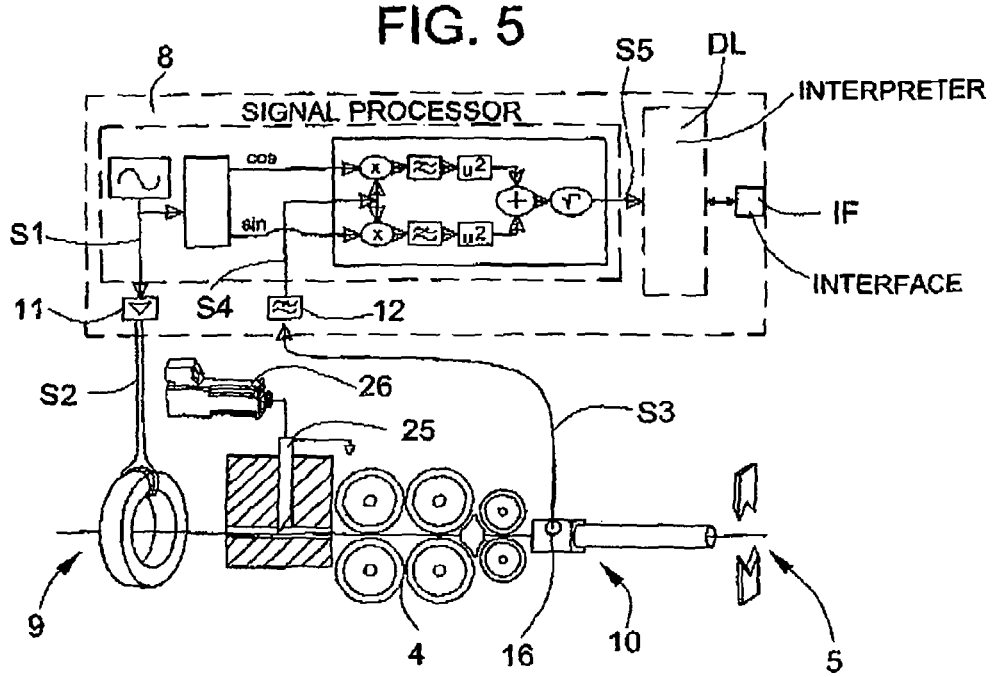
FIG. 5 is a schematic diagram of the wire-processing device according to the present invention with a slit-cutter.

FIG. 5 shows the wire-processing device 1' with a slit-cutter 25. By means of the slit-cutter 25 that is feedable by means of a cutter drive 26, the wire 3 can be cut into or slit along the lengthwise axis of the wire as far as the conductor. After this, by means of the cutters 13, 14, the wire is cut into in front of and behind the slit and the insulation sleeve removed. If the slit-cutter 25 that is connected to ground 18 touches the conductor, the amplitude of the wire signal SW and thus the input signal S3 of the output coupler 10 decreases. From the change in the signal (change in amplitude independent of the phase displacement of the signal), the signal processor 8 recognizes that the slit-cutter 25 is touching the conductor. Simultaneously, the feed (depth of penetration) or position of the slit-cutter is thereby sensed and the diameter of the conductor determined and the depth of penetration at the next cut reduced.

Figure 6:
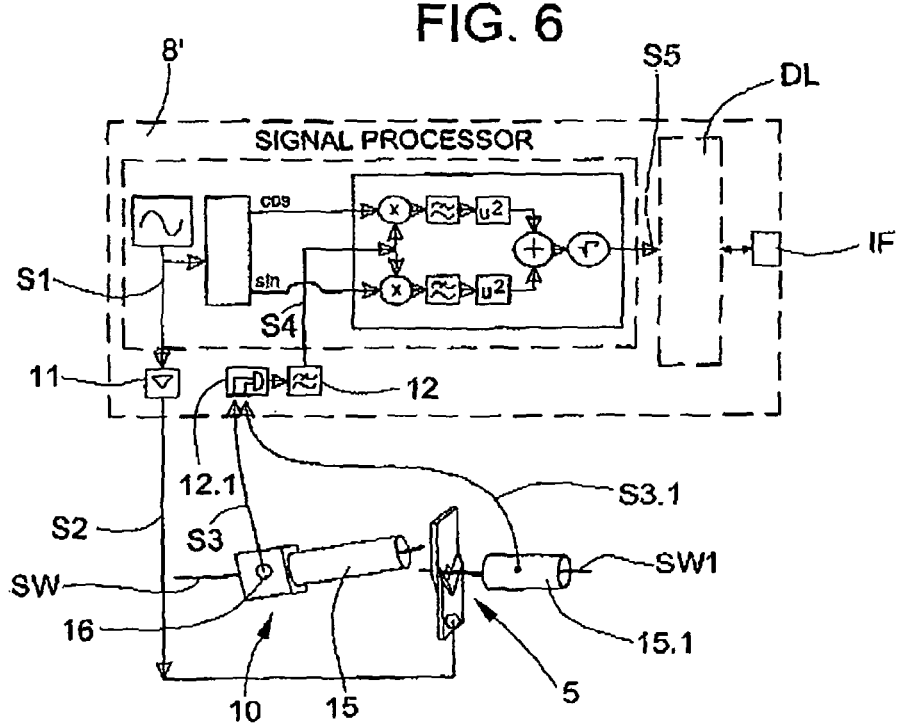
FIG. 6 is a schematic diagram of an alternate embodiment of the signal input coupler and signal output coupler according to the present invention.

FIG. 6 shows an alternate embodiment of the signal device 8' for the input signal coupling and of the output signal coupling. In this variant, the trailing wire-end can also be monitored with respect to wire diameter and penetration depth during processing. The input signal coupling takes place directly via the insulated cutter head 5 with the cutters 13, 14. The wire guide 15 is swiveled out of the wire transporting device. A further wire guide 15.1 capacitively senses another wire signal SW1, the another wire signal SW1 being fed to an input phase 12.1 of the input signal processor 12.

FIG. 5 and FIG. 6 show details of the signal processor 8, 8' for interpreting the input signal S4. The input signal S4 is multiplied by two signals, sine, cosine, that are displaced by 90 .degree. and have the frequency of the output signal S2. (The multiplying device is symbolized with "x"). By means of the multiplication, the phase-independent input signal S4 is generated. As a result of the signal multiplication, new, undesired frequencies occur that are suppressed by means of a filter. (The filtering device is symbolized with ""). The signals are then squared (the squaring device is symbolized with "$u^2$"), their squares added, and the square root of the sum calculated (the adding device is symbolized with "+" and the square-rooting device with "√") A generated signal S5 is always positive and phase-independent of the input signal 84. In response to the signal change in the signal S5, an interpreter referenced with DL generates status signals such as, for example, an error message "Conductor was touched" and communicates the status signals across an interface IF to the machine control.

As a variant embodiment, the input coupler 9 can function on the capacitive principle and as another variant embodiment the output coupler 10 can function on the inductive principle.

The measuring device 2 can also be used to monitor stripping of the insulation. If the cutters 13, 14, 25 touch the conductor while the insulation is being stripped, the signal processor 8 generates an error message as stated above.

While processing wire of the same type, it is also possible for the automatic determination of the diameter of the conductor to take place from time to time or before each insulation-stripping operation. The cutting device therefore always knows the current diameter of the conductor.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A device for determining a diameter of a conductor of a wire, the device comprising:
    an input coupler for receiving an output signal and applying said output signal to the wire to generate a signal that is conducted through the conductor, wherein said input coupler includes a ring core with a primary winding wound thereon, said output signal being received by said primary winding such that when the wire is passed through said ring core the wire forms a single secondary winding;
    an output coupler for contactlessly sensing said signal that is conducted through the conductor to generate an input signal from said output coupler;

at least one contact element; and
a signal processor for generating said output signal, said signal processor connected to said input coupler for sending said output signal to said input coupler, and said signal processor connected to said output coupler for receiving said input signal from said output coupler, said input signal being changeable by said at least one contact element when said at least one contact element selectively contacts the conductor, said signal processor determining the diameter of the conductor based on a position of the at least one contact element and a change of said input signal.

2. The device according to claim 1 wherein said output coupler functions capacitively to sense said signal being conducted through the conductor.

3. The device according to claim 1 wherein said at least one contact element includes cutters of a cutter head of a wire-processing device to which cutters an electrical potential is applied and said cutters are configured to touch the conductor and change said input signal when cutting.

4. The device according to claim 1 wherein said output coupler includes a wire guide that is electrically insulated against an applied electrical potential and operates as a capacitive sensor.

5. The device according to claim 1 wherein said input coupler includes an electrically insulated cutter head with cutters and said output coupler includes a wire guide that capacitively generates said input signal to said signal processor.

6. The device according to claim 1 wherein said input coupler includes an electrically insulated cutter head with cutters and said output coupler includes a wire guide that capacitively generates said input signal to said signal processor, said wire guide including separate sections positioned on opposite sides of said cutter head and each section capacitively generates an associated input signal to said signal processor.

7. The device according to claim 1 wherein said contact element is a cutter and the diameter (D) of the conductor is calculated according to a formula $D = y \cdot \sin(\alpha/2)$ where "y" can be derived from a position of said cutter at contact with the conductor and "$\alpha$" is an angle of opening of said cutter.

8. A device for determining a diameter of a conductor of a wire, the device comprising:
an input coupler for receiving an output signal and applying said output signal to the wire to generate a signal that is conducted through the conductor, wherein said input coupler includes a ring core with a primary winding wound thereon, said output signal being received by said primary winding such that when the wire is passed through said ring core the wire forms a single secondary winding;
an output coupler for contactlessly sensing said signal that is conducted through the conductor to generate an input signal from said output coupler;
a cutter head; and
a signal processor for generating said output signal, said signal processor connected to said input coupler for sending said output signal to said input coupler, and said signal processor connected to said output coupler for receiving said input signal from said output coupler, said input signal being changeable by said cutter head when said cutter head selectively contacts the conductor, said signal processor determining the diameter of the conductor based on a position of the cutter head and a change of said input signal.

9. The device according to claim 8 wherein said output coupler functions capacitively to sense said signal being conducted through the conductor.

10. The device according to claim 8 wherein said cutter head includes cutters having an electrical potential applied thereto and said cutters are configured to touch the conductor and change said input signal when cutting.

11. The device according to claim 8 wherein said output coupler includes a wire guide that is electrically insulated against an applied electrical potential and operates as a capacitive sensor.

12. The device according to claim 8 wherein the diameter (D) of the conductor is calculated according to a formula $D = y \cdot \sin(\alpha/2)$ where "y" can be derived from a position of said cutter head at contact with the conductor and "$\alpha$" is an angle of opening of said cutter head.

* * * * *